United States Patent
Kim et al.

(10) Patent No.: US 8,260,326 B2
(45) Date of Patent: Sep. 4, 2012

(54) SYSTEM AND METHOD FOR PROVIDING SHORT MESSAGE SERVICE IN WIRELESS COMMUNICATION SYSTEM

(75) Inventors: Jun-Hyung Kim, Suwon-si (KR);
Ji-Cheol Lee, Yongin-si (KR);
Jung-Shin Park, Seoul (KR);
Nae-Hyun Lim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 826 days.

(21) Appl. No.: 12/199,352

(22) Filed: Aug. 27, 2008

(65) Prior Publication Data

US 2009/0061916 A1 Mar. 5, 2009

(30) Foreign Application Priority Data

Sep. 3, 2007 (KR) ................................. 2007-88968

(51) Int. Cl.
*H04W 68/00* (2009.01)
(52) U.S. Cl. ........................................ 455/458; 455/466
(58) Field of Classification Search .................. 455/466, 455/574, 458
See application file for complete search history.

(56) References Cited

U.S. PATENT DOCUMENTS

| 7,801,072 B2 | 9/2010 | Son et al. | |
| 2004/0092280 A1* | 5/2004 | Lee | 455/515 |
| 2005/0122936 A1* | 6/2005 | Son et al. | 370/331 |

FOREIGN PATENT DOCUMENTS

| KR | 10-0480652 B1 | 4/2005 |
| KR | 10-0686775 B1 | 2/2007 |

* cited by examiner

*Primary Examiner* — Vladimir Magloire
(74) *Attorney, Agent, or Firm* — Jefferson IP Law, LLP

(57) ABSTRACT

A method of receiving a Short Message Service (SMS) message by a mobile station in a wireless communication system is provided. The method includes receiving a paging message including a first field indicating whether there is a broadcast SMS message to be received from a base station, if the first field is set to a value indicating that the broadcast SMS message is to be received, recognizing a broadcast transport Connection IDentifier (CID) indicating a channel over which to transmit the broadcast SMS message, and a data burst allocation region by decoding a broadcast MAP Information Element (IE), and receiving the broadcast SMS message, transmitted using a resource of the data burst allocation region, through the channel over which to transmit the broadcast SMS message.

20 Claims, 5 Drawing Sheets

SYSTEM AND METHOD FOR PROVIDING SHORT MESSAGE SERVICE IN WIRELESS COMMUNICATION SYSTEM

PRIORITY

This application claims the benefit under 35 U.S.C. §119(a) of a Korean patent application filed in the Korean Industrial Property Office on Sep. 3, 2007, and assigned Serial No. 2007-0088968, the entire disclosure of which is hereby incorporated by reference.

BACKGROUND OF THE INVENTION

1. Field of the Invention

The present invention relates to a wireless communication system. More particularly, the present invention relates to a system and method for providing a Short Message Service (hereinafter referred to as "SMS") in a wireless communication system.

2. Description of the Related Art

There are various services for users in a wireless communication system. More particularly, an SMS service is a service that users frequently use.

FIG. 1 illustrates an operation of providing SMS in a conventional Code Division Multiple Access (CDMA) communication system.

Referring to FIG. 1, a base station performs paging to inform an idle mode mobile station that there is an SMS message to be delivered. Subsequently, the base station receives an ADDS page message from a Mobile Switching Center (MSC), and transmits an SMS message included in the ADDS page message to the mobile station in the form of a data burst message.

Along with the growth of communication technology, wideband frequencies are used in next generation wireless communication systems. That is, while conventional 3rd generation wireless communication systems use divided codes, next generation wireless communication systems use divided orthogonal frequencies. For example, the mobile WiMax system that is in the spotlight as a next generation wireless communication system employs an Orthogonal Frequency Division Multiple Access (OFDMA) scheme.

As mentioned above, a wireless communication system using divided orthogonal frequencies is different from a CDMA-based wireless communication system. Therefore, the wireless communication system using divided orthogonal frequencies needs to perform a procedure of providing SMS in a different manner from that in the CDMA-based wireless communication system. However, a concrete procedure for providing SMS in a wireless communication system using divided orthogonal frequencies is not yet defined.

Therefore, a need exists for a system and method for providing a Short Message Service (SMS) in a wireless communication system.

SUMMARY OF THE INVENTION

An aspect of the present invention is to address at least the above-mentioned problems and/or disadvantages and to provide at least the advantages described below. Accordingly, an aspect of the present invention is to provide a system and method for providing a broadcast SMS message in a wireless communication system using orthogonal frequencies.

Further, another aspect of the present invention is to provide a system and method for providing a unicast SMS message in a wireless communication system using orthogonal frequencies.

In accordance with an aspect of the present invention, a method of receiving an SMS message by a mobile station in a wireless communication system is provided. The method includes receiving a paging message including a first field indicating whether or not there is a broadcast SMS message to be received from a base station, if the first field is set to a value indicating that the broadcast SMS message is to be received, recognizing a broadcast transport Connection IDentifier (CID) indicating a channel over which to transmit the broadcast SMS message, and a data burst allocation region by decoding a broadcast MAP Information Element (IE), and receiving the broadcast SMS message, transmitted using a resource of the data burst allocation region, through the channel over which to transmit the broadcast SMS message.

In accordance with another aspect of the present invention, a method of transmitting an SMS message by a base station in a wireless communication system is provided. The method includes, if there is a broadcast SMS message to be transmitted, transmitting a paging message including a first field set to a value indicating that there is the broadcast SMS message to be transmitted, configuring a broadcast MAP Information Element (IE) including a broadcast transport Connection IDentifier (CID) indicating a channel over which to transmit the broadcast SMS message, and information on a data burst allocation region, and transmitting the broadcast SMS message by using the channel over which to transmit the broadcast SMS message and a resource of the data burst allocation region indicated by the broadcast MAP IE.

In accordance with yet another aspect of the present invention, a method of receiving an SMS message by an idle mode mobile station in a wireless communication system is provided. The method includes receiving a paging message from a base station, if a specific field in the paging message is set to a value indicating that a broadcast SMS message is to be transmitted, receiving the broadcast SMS message from the base station, if the specific field in the paging message is set to a value indicating that no broadcast SMS message is to be transmitted, determining if the paging message includes a value indicating the mobile station, if the paging message includes the value indicating the mobile station, identifying an action code field value of the paging message, if the action code field value corresponds to a value indicating that there is a unicast SMS message to be received from the base station, transitioning to an awake mode, and receiving the unicast SMS message from the base station after transitioning to the awake mode.

In accordance with still yet another aspect of the present invention, a method of transmitting an SMS message by a base station in a wireless communication system is provided. The method includes, if there is a broadcast SMS message to be transmitted to at least two or more mobile stations, setting a value of a specific field in a paging message to a value indicating the broadcast SMS message is to be transmitted, if there is a unicast SMS message to be transmitted a specific mobile station, setting the value of the specific field to a value indicating that the unicast SMS message is to be transmitted, and if the value of the specific field is the value indicating that the unicast SMS message is to be transmitted, transmitting the paging message including a value indicating the specific mobile station.

In accordance with still yet another aspect of the present invention, a wireless communication system is provided. The system includes a base station for, if there is a broadcast SMS message to be transmitted, transmitting a paging message including a first field set to a value indicating that there is the broadcast SMS message to be transmitted, configuring a broadcast MAP Information Element (IE) including a broadcast transport Connection IDentifier (CID) indicating a channel over which transmit the broadcast SMS message, and information on a data burst allocation region, including the broadcast MAP IE in a MAP region, and transmitting the broadcast SMS message by using the channel over which to transmit the broadcast SMS message and a resource of the data burst allocation region indicated by the broadcast MAP IE, and a mobile station for receiving a paging message including a first field indicating whether or not there is a broadcast SMS message to be received from the base station, recognizing a broadcast transport CID indicating a channel over which to transmit the broadcast SMS message if the first field is set to a value indicating that the broadcast SMS message is to be received, and a data burst allocation region by decoding a broadcast MAP IE, and receiving the broadcast SMS message, transmitted using a resource of the data burst allocation region, through the channel over which to transmit the broadcast SMS message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and configurations are omitted for clarity and conciseness.

Exemplary embodiments of the present invention provide a system and method for providing SMS in a wireless communication system using orthogonal frequencies.

According to exemplary embodiments of the present invention, SMS may be provided to a specific mobile station that is in an idle mode, or may also be provided to some or all mobile stations, as in the case of emergency SMS.

Figure 1:
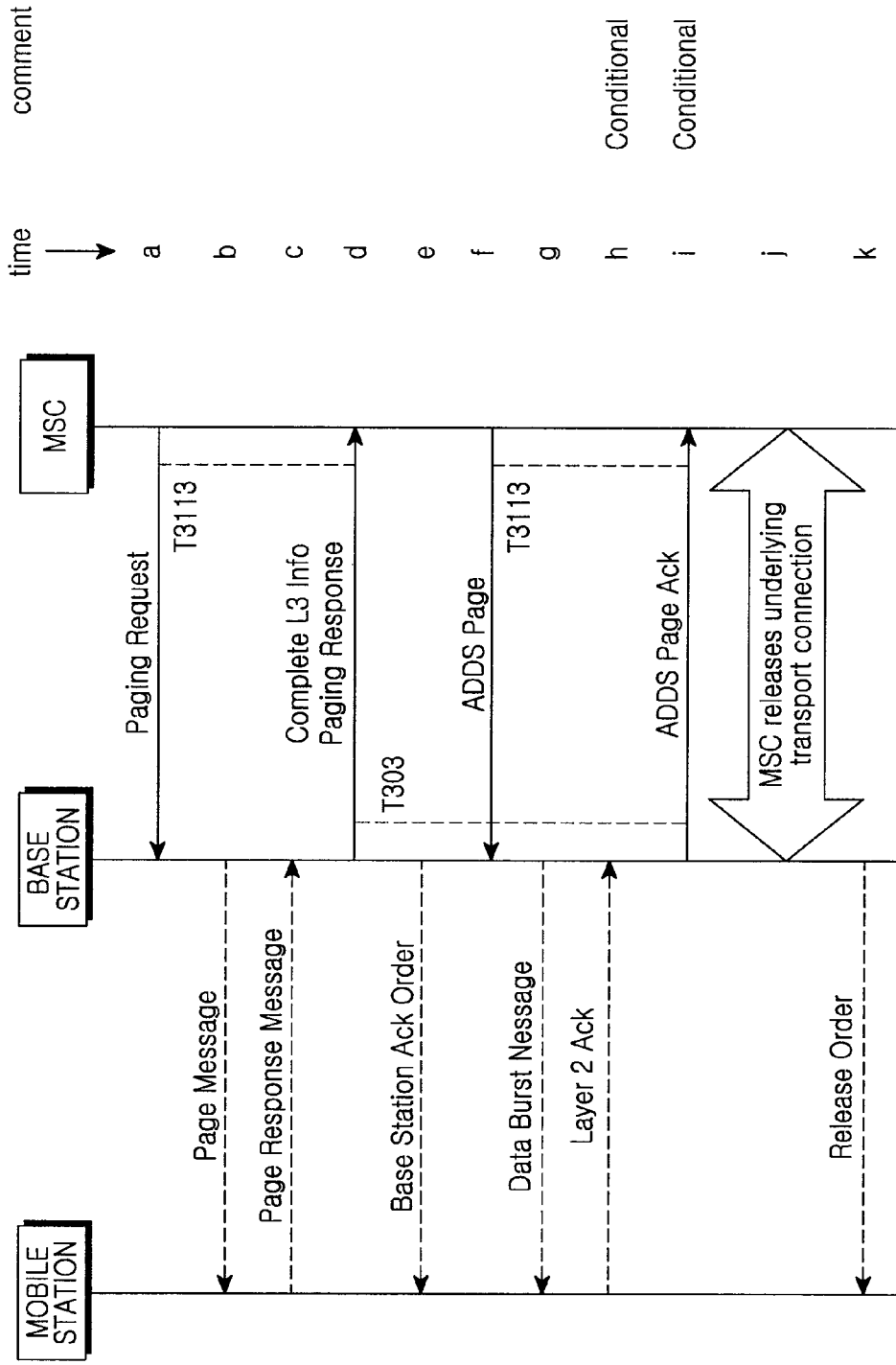
FIG. 1 is a signal flowchart illustrating an operation of providing SMS in a conventional CDMA communication system.
Figure 2:
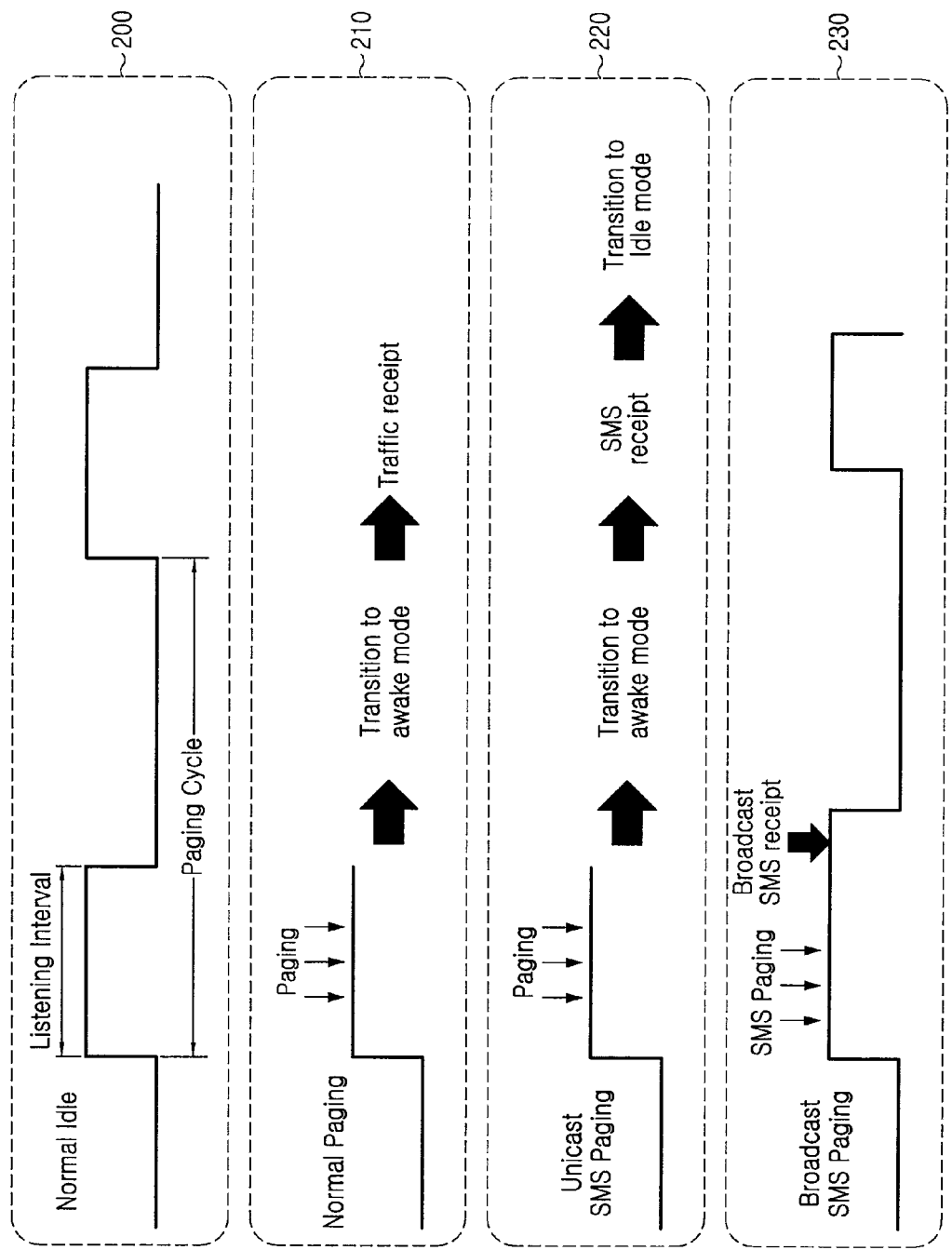
FIG. 2 is a view illustrating an operation of a mobile terminal in response to a receipt of a paging message in accordance with an exemplary embodiment of the present invention.

FIG. 2 illustrates an operation of a mobile terminal in response to a receipt of a paging message according to an exemplary embodiment of the present invention.

Referring to FIG. 2, the reference numeral "200" represents a conventional operation of a mobile station that is in an idle mode. The idle mode mobile station can periodically receive a mobile paging advertisement (hereinafter referred to as "MOB_PAG_ADV") message in a listening interval.

The reference numeral "210" represents an operation in which the idle mode mobile station receives a MOB_PAG-ADV message, transitions to an awake mode if the received MOB_PAG-ADV message includes a Medium Access Control (MAC) address corresponding to the mobile station, and then receives traffic.

The reference numeral "220" represents an operation in which the idle mode mobile station receives a MOB_PAG-ADV message, transitions to an awake mode if the received MOB_PAG-ADV message includes a MAC address corresponding to the mobile station, receives a unicast SMS message, and then transitions to an idle mode again.

The reference numeral "230" represents an operation in which the idle mode mobile terminal receives a MOB_PAG-ADV message, and then receives a broadcast SMS message according to a broadcast SMS message receipt indication of the MOB_PAG-ADV message.

An exemplary embodiment of the present invention proposes a new operation related to the operations represented by the reference numerals "220" and "230". That is, the exemplary embodiment of the present invention is intended to introduce a system and method for providing SMS, which is not yet defined in a wireless communication system using divided orthogonal frequencies.

The above-mentioned MOB_PAG-ADV message is used to awake at least one mobile station that is in an idle mode. In an exemplary embodiment of the present invention, a mobile station that has received a MOB_PAG-ADV message from a base station confirms an SMS message in an awake mode, and then transitions to an idle mode again, or confirms an SMS message in an idle mode.

For this end, an exemplary embodiment of the present invention newly proposes a MOB_PAG-ADV message having a format as presented below in Table 1.

TABLE 1

| Syntax | Size | Notes |
|---|---|---|
| MOB_PAG-ADV_Message_format( ) { | — | |
| Management Message Type = 62 | 8 bits | |
| Num_Paging_Group_Ids | 8 bits | |
| For(i=0;i<Num_Paging_group_IDs;i++) { | — | |
| Paging Group ID | 16 bits | |
| } | — | |

TABLE 1-continued

| Syntax | Size | Notes |
|---|---|---|
| Broadcast SMS Indication | 1 bit | Indication to SMS |
| If(Broadcast SMS Indication = 1) { | — | |
| Action Code | 3 bits | 0b000 = No Action Required<br>0b001 = Perform Ranging to established location and acknowledge message<br>0b010 = Enter network<br>0b011 = Unicast SMS<br>0b100 = Broadcast SMS |
| Reserved | 5 bits | |
| } | — | |
| else { | — | |
| Num_MACs | 8 bits | |
| For(j=0;j<Num_MACs;j++) { | — | |
| MS MAC Address Hash | 24 bits | |
| Action Code | 3 bits | |
| Reserved | 5 bits | |
| } | — | |
| } | — | |
| Padding | Variable | |
| TLV Encoded Information | Variable | |
| } | — | |

The MOB_PAG-ADV message newly proposed in the exemplary embodiment of the present invention includes a 1-bit broadcast SMS indication field and a 3-bit action code field.

On receiving the MOB_PAG-ADV message, a mobile station determines whether the broadcast SMS indication field has a value of zero (0) or one (1).

If the broadcast SMS indication field has a value of zero (0), the mobile station determines if the MOB_PAG-ADV message includes a MAC address corresponding to the mobile station. If the message includes the mobile station's MAC address, the mobile station performs an operation corresponding to the value of the action code field. If the action code field has a value of 0b011, the mobile station transitions to an awake mode, receives an SMS message, and then transitions to an idle mode again.

If the broadcast SMS indication field has a value of one (1), the mobile station recognizes that there is an SMS message to be received by all mobile stations. Thus, the mobile station waits for receipt of the SMS message in a listening interval of an idle mode state. After the mobile station receives the SMS message, it maintains a normal paging cycle.

As described above, a unicast SMS message may be provided to a specific mobile station when the broadcast SMS indication field of a MOB_PAG-ADV message has a value of zero (0), and a broadcast SMS message may be provided to a plurality of mobile stations when the broadcast SMS indication field has a value of one (1).

For a broadcast SMS message to be received by some or all mobile stations, the mobile stations must receive the broadcast SMS message irrespective of which mode they are in. That is, the mobile stations must be able to receive the broadcast SMS message in an idle mode, as well as an awake mode. For this end, the exemplary embodiment of present invention newly defines a Broadcast_MAP_IE for a broadcast SMS message. Also, the exemplary embodiment of the present invention newly defines a broadcast transport Connection IDentifier (CID) indicating a channel for broadcast SMS message transmission. The broadcast transport CID is a unique identifier needed to broadcast the same data burst to all mobile stations within a base station. Tables 2 and 3 as given below show a CID list to which the broadcast transport CID is added and the Broadcast_MAP_IE respectively. In table 2, contents to be entered in the description field follow the Institute of Electrical and Electronics Engineers (IEEE) 802.16 standard documents, of which is incorporated by reference.

TABLE 2

| CID | Value | Description |
|---|---|---|
| Ranging CID | 0x0000 | |
| Basic CID | 0x0001 – m | |
| Primary management | M + 1 – 2m | |
| Transport CISs, Secondary Mgt CIDs | 2m + 1 – FE9E | |
| Broadcast transport CID | FE9F | |
| Multicast CIDs | 0xFEA0-0xFEFE | |
| AAA initial ranging CID | 0xFEFE | |
| Multicast polling CIDs | 0xFF00-0xFFF9 | |
| Normal mode Multicast CID | 0xFFFA | |
| Sleep mode multicast CID | 0xFFFB | |
| Idle mode multicast CID | 0xFFFC | |
| Fragmentable broadcast CID | 0xFFFD | |
| Padding CID | 0xFFFE | |
| Broadcast CID | 0xFFFF | |

TABLE 3

| Syntax | Size | Notes |
|---|---|---|
| Broadcast_MAP_IE( ) { | | |
| DIUC | 4 bits | |
| Broadcast Transport CID | 16 bits | FE9F |
| OFDMA Symbol offset | 8 bits | |
| Subchannel offset | 6 bits | |
| Boosting | 3 bits | |
| NO. OFDMA Symbols | 7 bits | |
| NO. Subchannels | 6 bits | |
| Repetition Coding Indication | 2 bits | |
| } | | |

For example, when a mobile station receive a MOB_PAG-ADV message, and the broadcast SMS indication field of the received MOB_PAG-ADV message has a value of one (1), the mobile station receives a Broadcast_MAP_IE as presented in Table 3, and then confirms a broadcast transport CID included in the Broadcast_MAP_IE. A value used as the broadcast transport CID is known in advance by the mobile station, as given in Table 2. Thus, the mobile station recognizes the existence of traffic for broadcast, that is, a broadcast SMS message, by confirming the broadcast transport CID, and decodes a corresponding data burst region. Here, the traffic for broadcast may be SMS traffic. The mobile station can receive SMS by decoding the corresponding data burst region.

An awake mode mobile terminal can receive a Broadcast_MAP_IE without receiving a MOB_PAG-ADV message. Therefore, the awake mode mobile station may receive SMS at any time, and an idle mode mobile station may receive SMS after transitioning to an awake mode through a paging procedure.

Figure 3:
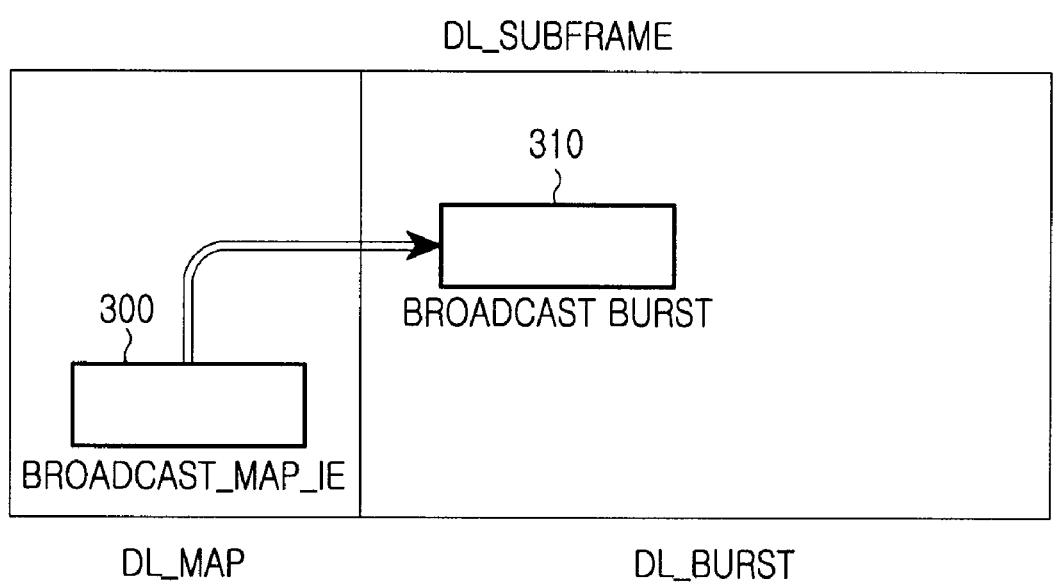
FIG. 3 is a view illustrating a frame structure indicating a broadcast burst carrying an SMS message in accordance with an exemplary embodiment of the present invention.

FIG. 3 illustrates a frame structure indicating a broadcast burst carrying an SMS message.

Referring to FIG. 3, a Broadcast_MAP_IE 300 having a format as presented above in Table 3 is located in the downlink MAP (DL-MAP) region of the frame, and the Broadcast_MAP_IE indicates a data burst region 310 carrying a broadcast SMS message.

Figure 4:
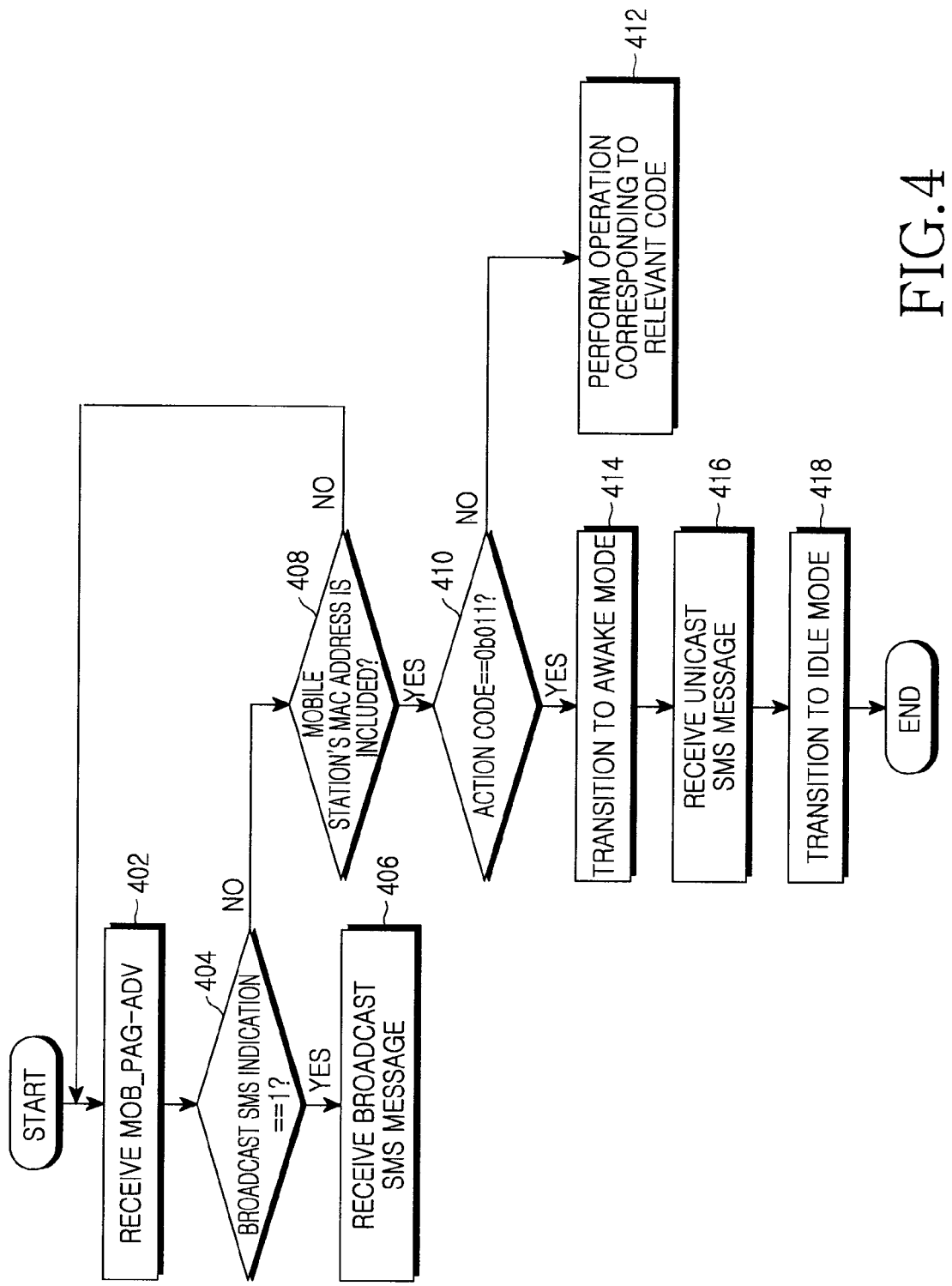
FIG. 4 is a flowchart illustrating an operation of receiving an SMS message by a mobile station in accordance with an exemplary embodiment of the present invention.

FIG. 4 illustrates an operation of receiving an SMS message by a mobile station according to an exemplary embodiment of the present invention.

Referring to FIG. 4, the mobile station receives a MOB_PAG-ADV message from a base station in step 402, and then proceeds to step 404. The mobile station identifies the value of the broadcast SMS indication field of the MOB_PAG-ADV message in step 404. When the broadcast SMS indication field has a value of one (1), that is, when there is a broadcast SMS message to be received by the mobile station, the mobile station proceeds to step 406. The mobile station receives the broadcast SMS message in a listening interval in step 406. On receiving the broadcast SMS message, the mobile station returns to an unavailable listening interval and maintains a normal paging cycle.

In contrast, when the broadcast SMS indication field has a value of zero (0), that is, when there is no broadcast SMS message, the mobile station proceeds to step 408 and determines if its MAC address is included in the MOB_PAG-ADV message. When the mobile station's MAC address is included in the MOB_PAG-ADV message, the mobile station proceeds to step 410 and determines if the action code field of the MOB_PAG-ADV message has a value of 0b011. The action code field value of 0b011 indicates that there is a unicast message to be received by the mobile station. When the action code field has a value of 0b011, the mobile station transitions to an awake mode in step 414, and then proceeds to step 416. The mobile station receives the unicast SMS message in step 416, and then proceeds to step 418. The mobile station transitions to an idle mode in step 418. However, when the action code field does not have a value of 0b011 in step 410, the mobile station proceeds to step 412, and performs an operation corresponding to a relevant action field value in step 412.

An operation of receiving a unicast SMS message by an awake mode mobile station may be the same as a conventional operation of receiving data.

Figure 5:
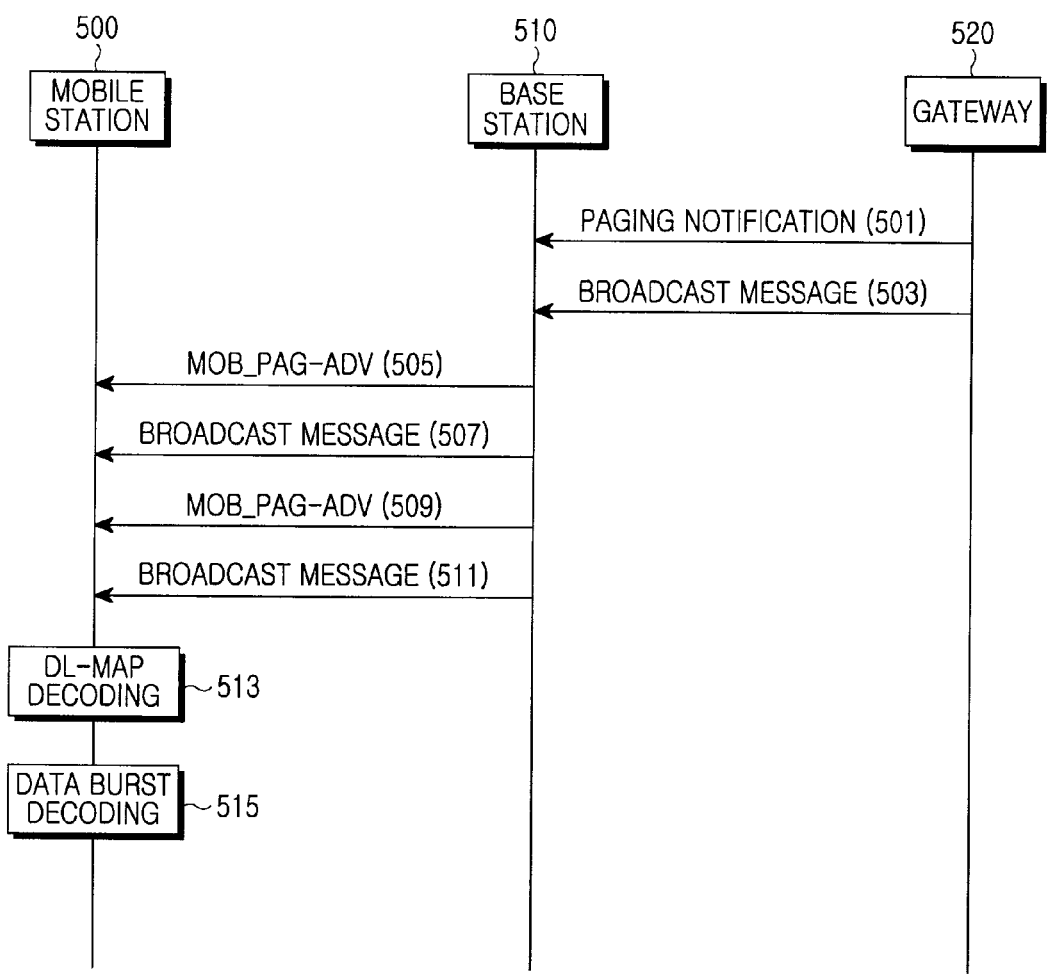
FIG. 5 is a timing chart illustrating a procedure of providing broadcast SMS in accordance with an exemplary embodiment of the present invention.

FIG. 5 illustrates a procedure of providing SMS according to an exemplary embodiment of the present invention.

Referring to FIG. 5, if a broadcast message to be transmitted is generated, a gateway 520 informs a base station 510 of a need for paging in step 501. The gateway 520 transmits the broadcast message to the base station 510 in step 503.

The base station 510 transmits a MOB_PAG-ADV message, the broadcast SMS indication field of which is set to one (1), to a mobile station 500 in step 505. The base station 510 transmits the broadcast message, that is, a broadcast SMS message, to the mobile station 500 in step 507. Steps 505 and 507 may be repeated in steps 509 and 511.

The mobile station 500 decodes a DL-MAP message in step 513, and then decodes a data burst included in a data burst region, the location of which is discovered by decoding the DL-MAP message in step 515. The number of mobile stations receiving the broadcast message may be at least one.

As described above, the present invention defines a procedure of receiving an SMS message by a mobile station in a wireless communication system using orthogonal frequencies, so that users can be provided with SMS, and service providers can create profit.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of receiving a Short Message Service (SMS) message by a mobile station in a wireless communication system, the method comprising:
   receiving a paging message including a first field indicating whether there is a broadcast SMS message to be received from a base station;
   if the first field is set to a value indicating that the broadcast SMS message is to be received, decoding a broadcast MAP Information Element (IE), wherein the broadcast MAP IE comprises an indication of a data burst allocation region included in a data region of a Down Link (DL) subframe, and a broadcast transport Connection Identifier (CID) comprising a unique identifier needed to broadcast a same data burst to all mobile stations within a base station;
   recognizing the broadcast transport CID indicating a channel over which to transmit the broadcast SMS message, and the data burst allocation region; and
   receiving the broadcast SMS message, transmitted using a resource of the data burst allocation region, wherein the DL subframe is transmitted through the channel over which to transmit the broadcast SMS message.

2. The method as claimed in claim 1, further comprising:
   if the first field is set to a value indicating that there is no need for broadcast SMS message receipt, determining if the paging message includes an identifier indicating the mobile station;
   if the paging message includes the identifier indicating the mobile station according to the result of the determining and a second field is set to a value indicating that a unicast SMS message is to be received, transitioning to an awake mode;
   receiving the unicast SMS message in the awake mode; and
   transitioning to an idle mode after receiving the unicast SMS message.

3. The method as claimed in claim 2, wherein the identifier indicating the mobile station comprises a Medium Access Control (MAC) address of the mobile station.

4. A method of transmitting a Short Message Service (SMS) message by a base station in a wireless communication system, the method comprising:
   if there is a broadcast SMS message to be transmitted, transmitting a paging message including a first field set to a value indicating that there is the broadcast SMS message to be transmitted;
   configuring a broadcast MAP Information Element (IE) including a broadcast transport Connection IDentifier (CID), comprising a unique identifier needed to broadcast a same data burst to all mobile stations within the base station, indicating a channel over which to transmit the broadcast SMS message, and information on a data burst allocation region included in a data region of a Down Link (DL) subframe; and transmitting the broadcast SMS message by using the channel over which to transmit the broadcast SMS message and a resource of the data burst allocation region indicated by the broadcast MAP IE, wherein the DL subframe is transmitted through the channel over which to transmit the broadcast SMS message.

5. The method as claimed in claim 4, further comprising, if there is no broadcast SMS message to be transmitted, setting the first field to a value indicating that there is no need for broadcast SMS message receipt, and transmitting the paging message with the first field included therein.

6. The method as claimed in claim 5, further comprising:
if there is a unicast SMS message to be transmitted to a mobile station, transmitting the paging message including an identifier indicating the mobile station and a second field set to a value instructing the mobile station to transition to an idle mode after receiving the unicast SMS message; and
transmitting the unicast SMS message after transmitting the paging message.

7. The method as claimed in claim 6, wherein the identifier indicating the mobile station comprises a Medium Access Control (MAC) address of the mobile station.

8. A wireless communication system, the system comprising:
a base station for, if there is a broadcast Short Message Service (SMS) message to be transmitted, transmitting a paging message including a first field set to a value indicating that there is the broadcast SMS message to be transmitted, for configuring a broadcast MAP Information Element (IE) including a broadcast transport Connection IDentifier (CID), comprising a unique identifier needed to broadcast a same data burst to all mobile stations within the base station, indicating a channel over which transmit the broadcast SMS message, and information on a data burst allocation region included in a data region of a Down Link (DL) subframe, including the broadcast MAP IE in a MAP region, and for transmitting the broadcast SMS message by using the channel over which to transmit the broadcast SMS message and a resource of the data burst allocation region indicated by the broadcast MAP IE, wherein the DL subframe is transmitted through the channel over which to transmit the broadcast SMS message; and
a mobile station for receiving the paging message including the first field indicating whether there is the broadcast SMS message to be received from the base station, for recognizing the broadcast transport CID indicating the channel over which to transmit the broadcast SMS message if the first field is set to the value indicating that the broadcast SMS message is to be received, and the data burst allocation region by decoding the broadcast MAP IE, and for receiving the broadcast SMS message, transmitted using the resource of the data burst allocation region, through the channel over which to transmit the broadcast SMS message.

9. The system as claimed in claim 8, wherein, if the first field is set to a value indicating that there is no need for broadcast SMS message receipt, the mobile station determines if the paging message includes an identifier indicating the mobile station, transitions to an awake mode if the paging message includes the identifier indicating the mobile station and a second field is set to a value indicating that a unicast SMS message is to be received, receives the unicast SMS message in the awake mode, and transitions to an idle mode after receiving the unicast SMS message.

10. The system as claimed in claim 9, wherein the identifier indicating the mobile station comprises a Medium Access Control (MAC) address of the mobile station.

11. The system as claimed in claim 8, wherein, if there is no broadcast SMS message to be transmitted, the base station sets the first field to a value indicating that there is no need for broadcast SMS message receipt, and transmits the paging message with the first field included therein.

12. The system as claimed in claim 11, wherein, if there is a unicast SMS message to be transmitted to a mobile station, the base station transmits the paging message including an identifier indicating the mobile station and a second field set to a value instructing the mobile station to transition to an idle mode after receiving the unicast SMS message, and transmits the unicast SMS message after transmitting the paging message.

13. A method of receiving a Short Message Service (SMS) message by an idle mode mobile station in a wireless communication system, the method comprising:
receiving a paging message comprising a specific field only for indicating whether a broadcast SMS message is to be transmitted from a base station;
if the specific field in the paging message is set to a value indicating that the broadcast SMS message is to be transmitted, receiving the broadcast SMS message from the base station;
if the specific field in the paging message is set to a value indicating that no broadcast SMS message is to be transmitted, determining if the paging message includes a value indicating the mobile station;
if the paging message includes the value indicating the mobile station, identifying an action code field value of the paging message;
if the action code field value corresponds to a value indicating that there is a unicast SMS message to be received from the base station, transitioning to an awake mode; and
receiving the unicast SMS message from the base station after transitioning to the awake mode.

14. The method as claimed in claim 13, wherein the broadcast SMS message is indicated by a broadcast transport MAP Information Element (IE) including a broadcast transport Connection IDentifier (CID) indicating a channel over which to transmit the broadcast SMS message.

15. The method as claimed in claim 13, wherein the value indicating the mobile station comprises a Medium Access Control (MAC) address of the mobile station.

16. The method as claimed in claim 13, further comprising transitioning to an idle mode after receiving the unicast SMS message.

17. The method as claimed in claim 13, wherein, if the specific field in the paging message is set to the value indicating that the broadcast SMS message is to be transmitted, the value indicating the mobile station is not included in the paging message.

18. A method of transmitting a Short Message Service (SMS) message by a base station in a wireless communication system, the method comprising:
if there is a broadcast SMS message to be transmitted to at least two or more mobile stations, setting a value of a specific field for indicating whether the broadcast SMS message is to be transmitted in a paging message to a value indicating the broadcast SMS message is to be transmitted;

if there is a unicast SMS message to be transmitted to a specific mobile station, setting the value of the specific field to a value indicating that the unicast SMS message is to be transmitted; and if the specific field is set to the value indicating that the unicast SMS message is to be transmitted, transmitting the paging message including a value indicating the specific mobile station.

19. The method as claimed in claim 18, further comprising transmitting a broadcast MAP Information Element (IE) including a broadcast transport Connection IDentifier (CID), which indicates a channel over which transmit the broadcast SMS message, to the mobile stations when transmitting the broadcast SMS message.

20. The method as claimed in claim 18, wherein the value indicating the specific mobile station comprises a Medium Access Control (MAC) address of the mobile station.

* * * * *